United States Patent [19]
Murphy et al.

[11] Patent Number: 5,820,377
[45] Date of Patent: *Oct. 13, 1998

[54] BLOCK RETAINING SLATE FOR FACILITATING ENGAGEMENT AND ALIGNMENT OF BLOCKS

[76] Inventors: Kevin Murphy, 97 Forrest St., Plaistow, N.H. 03865; Gregory P. Basque, 199 Depot St., Fitchburg, Mass. 01420

[*] Notice: The term of this patent shall not extend beyond the expiration date of Pat. No. 5,391,078.

[21] Appl. No.: 604,812

[22] Filed: Feb. 23, 1996

Related U.S. Application Data

[63] Continuation-in-part of Ser. No. 290,601, Aug. 15, 1994, Pat. No. 5,536,170, which is a continuation-in-part of Ser. No. 74,795, Jun. 10, 1993, Pat. No. 5,391,078.

[51] Int. Cl.$^6$ .................................................. G09B 21/00
[52] U.S. Cl. ................................................................ 434/113
[58] Field of Search ................................. 434/113, 112, 434/115, 117; 446/118, 128

[56] References Cited

U.S. PATENT DOCUMENTS

| | | | |
|---|---|---|---|
| 4,993,984 | 2/1991 | Matarese | 446/118 |
| 5,391,078 | 2/1995 | Murphy | 434/113 |
| 5,536,170 | 7/1996 | Murphy | 434/113 |
| 5,551,877 | 9/1996 | Murphy | 434/113 |

FOREIGN PATENT DOCUMENTS

| | | | |
|---|---|---|---|
| 60919 | 2/1955 | France | 446/118 |
| 2538713 | 7/1984 | France | 446/118 |

*Primary Examiner*—Jeffrey A. Smith

[57] ABSTRACT

A block retaining slate for engaging blocks, such as tactile recognition (e.g. Braille) blocks, so that the blocks can be arranged and aligned in a pattern. The block retaining slate includes a base portion and block engaging members extending from the base portion. The block engaging members include a rounded block receiving region, for receiving and engaging with an engaging region, such as a cavity, in the block. The block engaging members are arranged in a predefined pattern forming groups of block engaging members including rows and columns of block engaging members so that the blocks are aligned in rows and columns on the block retaining slate on a group of block engaging members. The block retaining slate further includes spaced regions and/or ridge portions between the rows and columns of block engaging members to facilitate the alignment of the blocks on the block retaining slate.

11 Claims, 1 Drawing Sheet

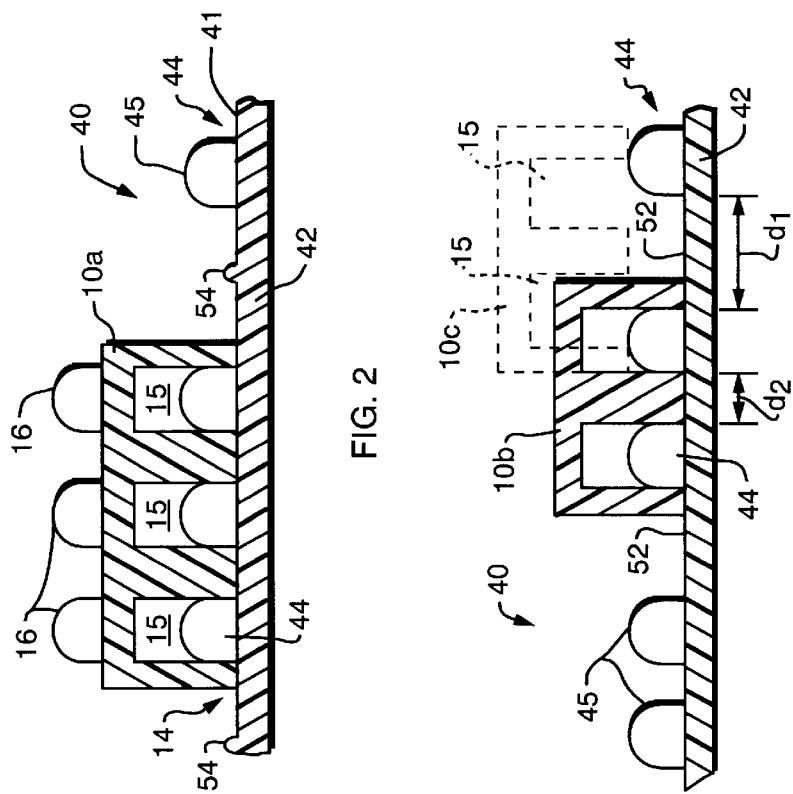
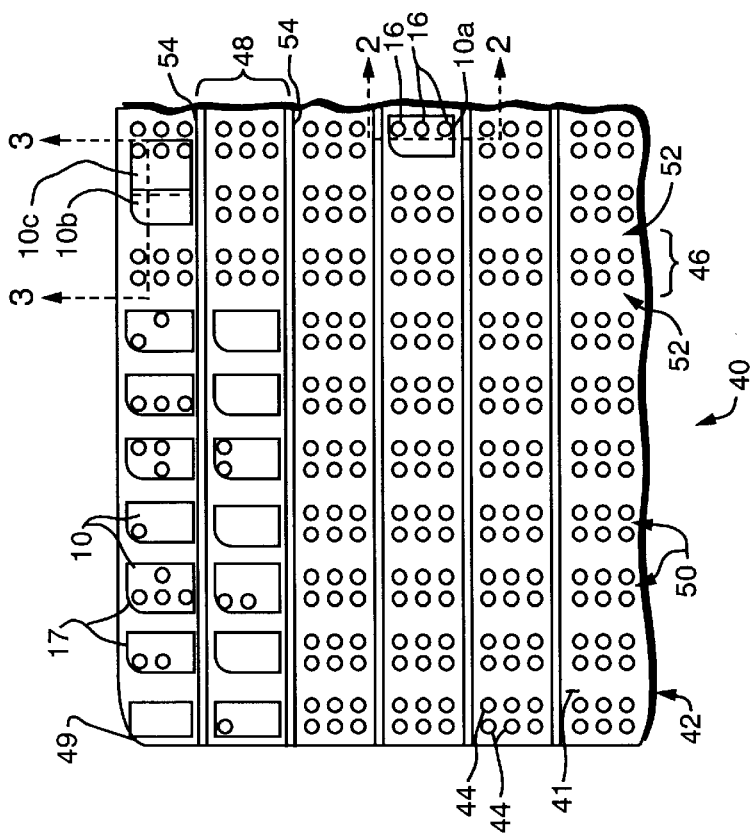

BLOCK RETAINING SLATE FOR FACILITATING ENGAGEMENT AND ALIGNMENT OF BLOCKS

RELATED APPLICATIONS

This Application is a continuation-in-part of U.S. Pat. application No. 08/290,601 filed Aug. 15, 1994, entitled "INTERCHANGEABLE SYMBOLIC LANGUAGE OVERLAY SYSTEM FOR PUSH BUTTON OPERATED DEVICE", which is a continuation-in-part of U.S. Pat. application No. 08/074,795 filed Jun. 10, 1993, now U.S. Pat. No. 5,391,078 issued Feb. 21, 1995, entitled "SYMBOLIC LANGUAGE TEACHING AND COMMUNICATIONS SYSTEM UTILIZING TACTILE PATTERN DISCRIMINATION", both of which are fully incorporated herein by reference.

FIELD OF THE INVENTION

This invention relates to block retaining slates, and more particularly, to a block retaining slate for facilitating engagement and alignment of tactile recognition blocks.

BACKGROUND OF THE INVENTION

Symbolic language teaching and communications systems, such as that disclosed in U.S. Pat. Nos. 4,880,384 and 5,391,078 include one or more blocks having at least tactilly recognizable symbols, such as Braille characters. A block retaining slate or board is used in these systems, for engaging and arranging the blocks, for example, to create words, phrases, sentences or other combinations of symbols or characters. The block retaining slate typically includes a number of block engaging members, such as protrusions, for engaging with and holding the blocks.

One difficulty with the existing block retaining slates is the engagement and alignment of the blocks on the block retaining slate, particularly by a visually impaired individual. For example, the blocks are typically engaged with the block retaining slate in a friction fit with block engaging members and require the engaging region of the block to be aligned with the block engaging members. The block is then "pressed" onto the block engaging members. The arrangement of the engaging members and the prior art flat top region of the engaging members on the existing block retaining slates cause the blocks to slide along the top surface of the block retaining slate and results in significant difficulty aligning the blocks with the block engaging members. Thus, the existing block retaining slates require unnecessary effort and difficulty to engage or secure the blocks. Also, there is difficulty in aligning the blocks with other blocks on the retaining slate.

Accordingly, what is needed is a block retaining slate having engaging members with a rounded or semi-spherical shape to allow blocks, such as tactile recognition blocks, to be easily secured or engaged with the block retaining slate. A block retaining slate is also needed which has block engaging members arranged in a manner that allows for the individual blocks to be easily positioned and aligned with other blocks on the block retaining slate.

SUMMARY OF THE INVENTION

The present invention features a block retaining slate for retaining one or more blocks, such as tactile recognition (e.g. Braille) blocks used in a symbolic language teaching and communication system, each block having an engaging region. The block retaining slate includes a base portion having at least a first and second surface and a plurality of block engaging members arranged in a predefined pattern on the first surface, for engaging with the blocks. Each block engaging member includes a rounded block receiving region, such as a semi-spherical region, for receiving the engaging region of each block and facilitating engagement with the engaging region.

According to the preferred embodiment, the predefined pattern of the plurality of block engaging members are arranged in a plurality of groups of block engaging members so that each group of block engaged members corresponds to one of the blocks, for engaging the block. The block retaining slate includes a spaced region between each group of blocks engaging members. The spaced region between each group of block engaging members has a predetermined distance which is greater than a predetermined distance between each block engaging member within each group of block engaging members. This predefined pattern of groups of block engaging members having spaced regions between each group of block engaging members allows each block to be easily arranged and aligned proximate other blocks on the block retaining slate.

In one preferred embodiment, the predefined pattern of block engaging members includes at least one row of block engaging members and at least one column of block engaging members. Each group of block engaging members is defined by the intersection of one of the rows of block engaging members and one of the columns of block engaging members and is adapted to engage each block so that the blocks are aligned in predefined rows and columns. This preferred embodiment further includes the spaced region between each column of block engaging members so that each block engages a group of block engaging members in one of the columns of block engaging members and adjacent the spaced regions. This preferred embodiment further includes a ridge portion between each row of block engaging members so that each block engages a group of block engaging members in one of the rows of block engaging members and adjacent the ridge portions.

BRIEF DESCRIPTION OF THE DRAWINGS

These and other features and advantages of the present invention will be better understood by reading the following detailed description, taken together with the drawings wherein:

FIG. 1 is a top view of a block retaining slate having blocks arranged thereon according to the present invention;

FIG. 2 is a cross-sectional view of FIG. 1 taken along lines 2—2 of the rows of block engaging members on the block retaining slate according to one embodiment of the present invention; and FIG. 3 is a cross-sectional view of FIG. 1 taken along lines 3—3 of columns of block engaging members on the block retaining slate according to one embodiment of the present invention.

DETAILED DESCRIPTION OF THE PREFERRED EMBODIMENT

The block retaining slate 40, FIG. 1, according to the present invention is used with blocks 10, such as tactile recognition (e.g. Braille) blocks used, for example, in a symbolic language teaching and communication system such as that disclosed in U.S. Pat. Nos. 4,880,384 and 5,391,078 and incorporated herein by reference. The blocks 10 are engaged with and arranged on the block retaining slate 40, for example, to form words, phrases, sentences or other arrangements of symbols or characters used in teaching and communicating using a symbolic language such as Braille. Some blocks 10a include a tactilely recognizable top surface having one or more protrusions 16, for example, representing a Braille character or symbol. Other blocks 10b may include a flat top surface.

The block retaining slate 40 includes a base portion 42, such as a flexible or rigid board, and a plurality of block engaging members 44 arranged in a predefined pattern on a first surface 41 of the base portion 42. Typically, the base portion 42 and block engaging members 44 are made of a plastic or other rigid material. A second surface of the block retaining slate (not shown) may include a material such as magnets, VELCRO® brand hook-and-loop fasteners, and rubber to allow the block retaining slate 40 to be held firmly in place on a surface. The blocks 10 engage the block engaging members 44 on the first surface 41 block retaining slate 40 so that the blocks 10 can be arranged and aligned, for example, to form combinations of characters or symbols used in symbolic language teaching and communications, such as Braille words.

According to the preferred embodiment, the predefined pattern of block engaging members 44 include groups 50 of engaging members 44 adapted to engage one of the blocks 10. The block retaining slate 40 further includes spaced regions 52 between each group 50 of engaging members 44 so that one block 10c (shown in phantom in FIGS. 1 and 3) will not engage block engaging members 44 in two adjacent groups. The embodiment shown in FIG. 1 includes six engaging members 44 in each group 50, however, the present invention contemplates any number of engaging members 44 in each group 50 of engaging members.

The predefined pattern of block engaging members 44, according to one preferred embodiment, includes columns 46 of block engaging members and rows 48 of block engaging members 44. The columns 46 and rows 48 of engaging members 44 form groups 50 of engaging members 44 with each group 50 of engaging members 44 defined by the intersection of one column 46 and one row 48 of engaging members. The block retaining slate 40 includes spaced regions 52 between each column 46 (or row 48) of block engaging members 44. Although the predefined pattern is shown as rows and columns of block engaging members defining groups of block engaging members, the present invention contemplates other patterns that define groups of block engaging members with spaced regions in between.

According to one preferred embodiment, the block retaining slate 40 further includes a ridge or rib portion 54 between each row 48 (or column 46) of block engaging members 44. The present invention also contemplates having ribs or ridges 54 between both the columns 46 and rows 48 or having spaced regions 52 between both columns 46 and rows 48. The spaced regions 52 and/or ribs or ridges 54 facilitate alignment of the blocks 10 with the columns 46 and rows 48 (and with/proximate other blocks 10) on the block retaining slate 40, by preventing the blocks 10c (as shown in phantom in FIG. 3) from engaging with engaging members 44 in two adjacent groups 50 across the spaced region 52 (or across the rib or ridge portion 54). This predefined pattern of block engaging members 44 is particularly useful for disabled or visually impaired individuals who may have difficulty with positioning and aligning blocks 10 on the block retaining slate 40. Visually impaired individuals, especially children, can easily slide their fingers along the spaced region 52 or rib 54 and secure the block 10 with a group 50 of engaging members 44 into the desired alignment.

Aligning the blocks 10, e.g. in columns and rows, on the retaining slate 40 provides a further advantage in using the tactile recognition block to teach or learn Braille. An individual learning to read Braille, particularly a visually impaired child, can easily go across one line of Braille chracters and then drop down to the next line of characters without skipping a row or re-reading the same row.

According to one embodiment, the block retaining slate 40 further includes a rounded corner region 49 so that the block retaining slate 40 can be properly oriented and the symbols or characters arranged on the block retaining slate 40 can be properly recognized. The preferred embodiment of the blocks 10 includes a rounded corner region 17 that allows the blocks 10 to be properly oriented on the block retaining slate 40, for example, so that the characters or symbols depicted on the blocks 10 are properly oriented for tactile recognition.

Each block 10, FIG. 2, includes an engaging region 14, for engaging with block engaging members 44 of the block retaining slate 40. According to the preferred embodiment, the engaging region 14 on each block 10 includes one or more cavities 15 within the block 10 that receive the block engaging members 44, for example, in a friction fit.

According to the preferred embodiment, each block engaging member 44 includes a rounded block receiving region 45, such as semi-spherical region, for being received in the cavities 15 of the engaging region 14 of each block 10. The rounded block receiving region 45 allows the block engaging members 44 to be more easily received in the cavities 15 and into engagement with the block 10. Accordingly, a disabled or visually impaired individual can more easily align and engage the blocks 10 with the engaging members 44.

When a block 10c (shown in phantom), FIG. 3, is positioned over a spaced region 52 or over a rib or ridge portion (not shown) the cavities 15 in the engaging region 14 of the block 10c are unable to receive and engage with the block engaging members 44. For example, the spaced region 52 between the groups 50 of block engaging members 44 has a distance $d_1$, which is greater than the distance $d_2$ between the engaging members 44 within each group 50. The spacing and the rounded block receiving regions 45 allow the blocks 10 to be more easily engaged with a group 50 of engaging members 44.

Accordingly, the block retaining slate according to the present invention facilitates the engagement of blocks, such as tactile recognition (e.g. Braille) blocks, with the block engaging members on the block retaining slate. The block retaining slate according to the present invention includes a predefined pattern of block engaging members that facilitates proper alignment of the blocks with other blocks on the block retaining slate, for example, so that a combination of characters or symbols (e.g. a word, phrase, or sentence) can be arranged on the block retaining slate.

Modifications and substitutions by one of ordinary skill in the art are considered to be within the scope of the present invention which is not to be limited except by the claims which follow.

What is claimed is:

1. A block retaining slate for blocks having an engaging region, said block retaining slate comprising:

a base portion having at least a first and second surface; and a plurality of block engaging members arranged in a predefined pattern including a plurality of groups of block engaging members on said first surface with a spaced region between each of said plurality of groups of block engaging members on all sides of each of said plurality of block engaging members, wherein each block engaging member of said plurality of block engaging members includes a block receiving region, for receiving an engaging region of at least one block, and wherein said spaced region between each of said plurality of groups of block engaging members of said block retaining slate has a predetermined distance greater than a predetermined distance between each block engaging member within each of said plurality of groups, such that each of said plurality of groups of block engaging members is adapted to engage said at least one block.

2. The block retaining slate of claim 1 wherein said block receiving region of each said block engaging member includes a rounded region.

3. The block retaining slate of claim 1, wherein said predetermined pattern of said plurality of block engaging members includes at least one row of block engaging members and at least one column of block engaging members;

at least one group of block engaging members defined by an intersection of one of said at least one row of block engaging members and one of said at least one column of block engaging members, said at least one group of block engaging members adapted to engage said at least one block such that said at least one block is aligned in at least one predefined row and column corresponding to said at least one row of block engaging members and said at least one column of block engaging members.

4. The block retaining slate of claim 3, further including a plurality of columns of block engaging members and a spaced region on said first surface between each of said plurality of columns of block engaging members; and wherein at least one group of block engaging members is adapted to engage said at least one block in one of said plurality of columns of block engaging members and adjacent said spaced region.

5. The block retaining slate of claim 3, further including a plurality of rows of block engaging members and a ridge on said first surface between each of said plurality of rows of block engaging members; and wherein a group of block engaging members is adapted to engage said at least one block in one of said plurality of rows of block engaging members adjacent said ridge.

6. A block retaining slate for blocks having an engaging region, said block retaining slate comprising:

a base portion having at least a first and second surface; and a plurality of block engaging members arranged in a predefined pattern on said first surface, said predefined pattern of said plurality of block engaging members including a plurality of rows of block engaging members and a plurality of columns of block engaging members, wherein an intersection of said plurality of rows of block engaging members and said plurality of columns of block engaging members defines a group of block engaging members, wherein there is a plurality of groups of block engaging members with a spaced region between each of said plurality of groups of block engaging members, and wherein said spaced region between each of said plurality of groups of block engaging members has a predetermined distance greater than a predetermined distance between each block engaging member within each of said plurality of groups at block engaging member, each group of block engaging members adapted to engage at least one of said blocks such that said at least one of said blocks is aligned in at least one predefined row and column.

7. The block retaining slate of claim 6, further including a ridge on said first surface in said spaced region between each of said plurality of rows of block engaging members, wherein a group of block engaging members is adapted to engage said at least one block in one of said plurality of rows of block engaging members adjacent said ridge.

8. The block retaining slate of claim 6, wherein each block engaging member of said plurality of block engaging members includes a rounded block receiving region, for receiving said engaging region of said at least one block.

9. A block retaining system comprising:

a block retaining slate including:

a base portion having at least a first and second surface; and a plurality of block engaging members arranged in a predefined pattern on said first surface, wherein said predefined pattern of said plurality of block engaging members includes a plurality of rows of block engaging members and a plurality of columns of block engaging members such that an intersection of each of said plurality of rows of block engaging members and each of said plurality of columns of block engaging members defines a group of block engaging members; and a plurality of blocks, each of said plurality of blocks being engagable only with a respective said group of block engaging members such that said plurality of blocks are aligned in predefined rows and columns corresponding to said plurality of rows of block engaging members and said plurality of columns of block engaging members.

10. The block retaining system of claim 9, further including a spaced region on said first surface of said block retaining slate between each of said plurality of columns of block engaging members, and wherein each of said plurality of blocks engage a respective said group of block engaging members adjacent said spaced region.

11. The block retaining system of claim 10, further including a ridge on said first surface of said block retaining slate between each of said plurality of rows of block engaging members, and wherein each said block engages a respective said group of block engaging members adjacent said ridge.

* * * * *